May 9, 1950 C. E. TACK ET AL 2,507,064
BRAKE HEAD ARRANGEMENT
Filed Feb. 8, 1946 2 Sheets-Sheet 1

INVENTORS.
Carl E. Tack
and Wesley A. Helsten,

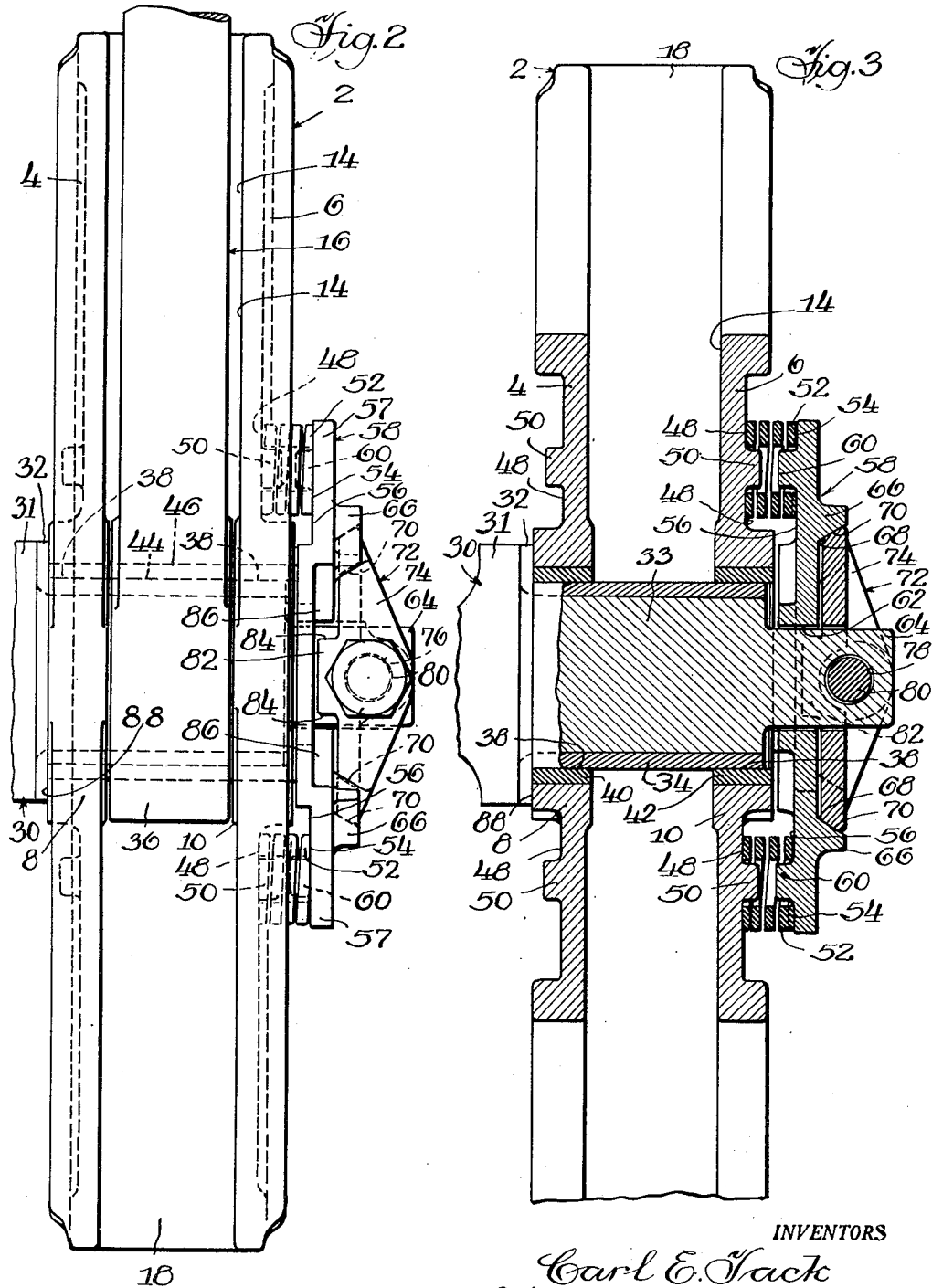

Patented May 9, 1950

2,507,064

UNITED STATES PATENT OFFICE 2,507,064

BRAKEHEAD ARRANGEMENT

Carl E. Tack and Wesley A. Helsten, Chicago, Ill., assignors to American Steel Foundries, Chicago, Ill., a corporation of New Jersey Application February 8, 1946, Serial No. 646,457

7 Claims. (Cl. 287—93)

This invention relates to railway brake equipment and more particularly to mechanism utilized in conjunction with a brake head and its supporting member for yieldably maintaining the brake head on the member, such mechanism being commonly known as a brake head balancing device.

The general object of our invention is to devise a brake head balancing device wherein the brake head is pivotally mounted on its supporting member in frictional engagement therewith, the balancing device including resilient means for urging said head and member into said engagement.

The present invention is an improvement on the generic design illustrated and described in a co-pending application, Serial No. 622,977, filed October 18, 1945, by Wesley A. Helsten, in the United States Patent Office, and wherein the brake head is urged into frictional engagement with a shoulder on the brake beam by spring means compressed between and interconnecting the head and a spring plate pivotally mounted on the beam, said plate having flat face frictional engagement with an abutment member fixed on the member, the improvement residing in the formation of the abutment member and the spring plate with wedge surfaces in frictional engagement, the engaged wedge surfaces being so located that the center of frictional contact area is a substantial distance from the center of pivot providing more effective control of the brake head than is possible with engaged flat friction surfaces on the abutment member and spring plate as in the aforesaid application, in the restricted space allotted for the brake assembly in the car truck.

With these and various other objects in view, the invention may consist of certain novel features of construction and operation, as will be more fully described and pointed out in the specification, drawings and claims appended hereto.

In the drawings:

Figure 2 is a rear view of the structure shown in Figure 1, only a fragmentary portion of the brake beam being shown; and Figure 3 is a sectional view thereof taken approximately in the plane of the hanger as indicated by the line 3—3 of Figure 1, the hanger being omitted in this view.

Figure 1:
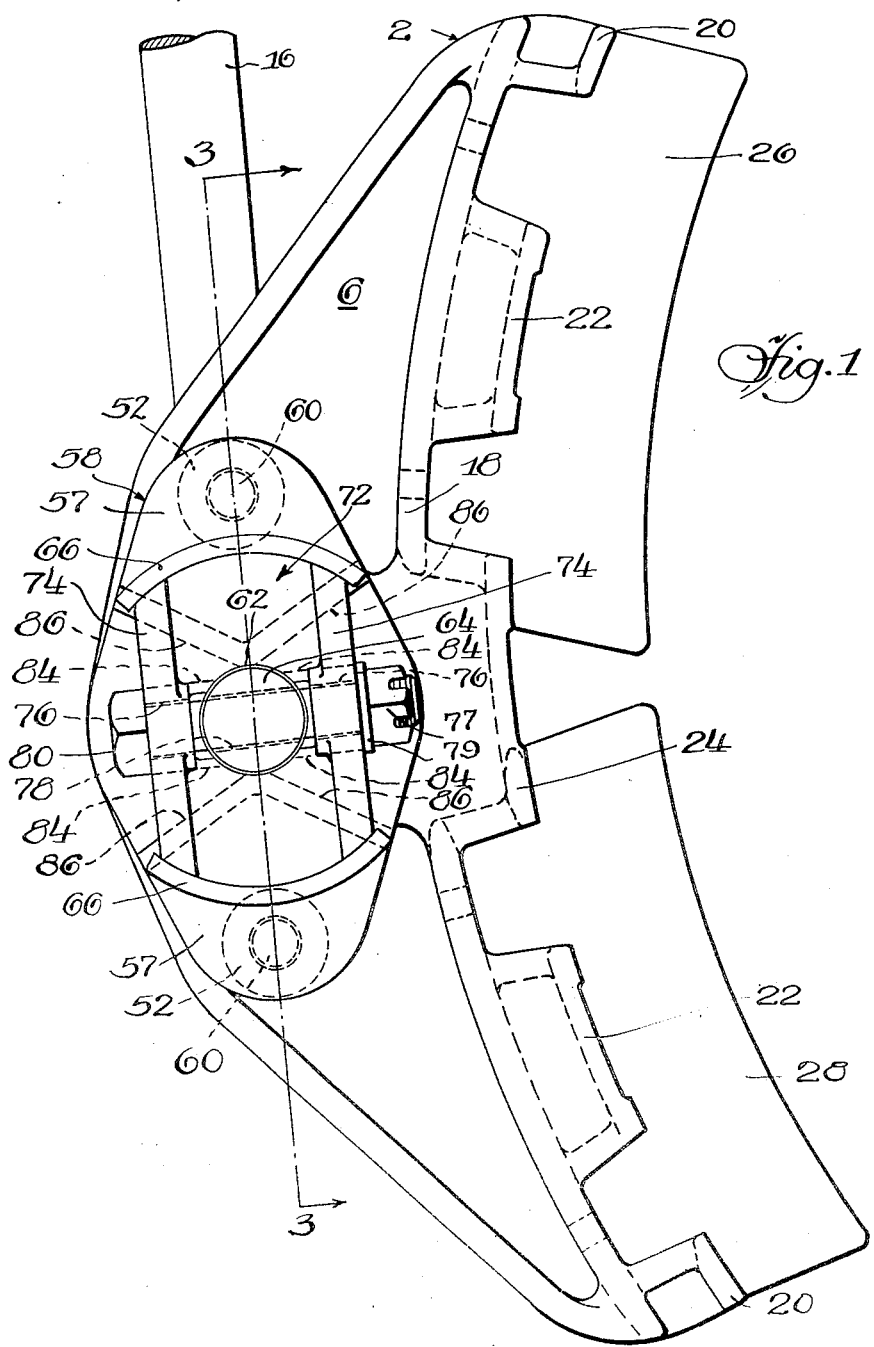
Figure 1 is a side elevation of a brake arrangement embodying our invention, only a fragmentary portion of the supporting hanger being shown.

Our novel brake arrangement comprises a brake head generally designated 2 and comprising spaced inboard and outboard walls 4 and 6 providing parallel bearing portions 8 and 10, respectively, said walls defining a passage 14 within which is received the brake hanger generally designated 16 pivotally supported at its upper extremity from an associated truck frame (not shown). The walls 4 and 6 of the brake head are connected by a transverse wall 18 extending therebetween and merging with spaced end lugs 20, 20, intermediate lugs 22, 22 and a central lug 24 providing support in the usual manner through the medium of a key or keys (not shown) for the upper and lower brake shoes 26 and 28.

A brake beam generally designated 30 is shown with the end thereof formed with a shoulder 31 having secured thereto a wear plate 32 as by welding and having projecting from said shoulder a journal portion or trunnion 33 to which may be tightly fitted a bushing 34. The trunnion 33 extends through aligned openings in the brake head bearing portions 8 and 10 and the hanger bearing portion 36 with the bushing 34 of said trunnion in bearing engagement as at 38 with bushings 40 and 42 fitted respectively in the bearing portions 8 and 10 of the brake head and as at 44 with the bushing 46 of the hanger bearing portion 36.

On opposite sides of each of the bearing portions 8 and 10 of the brake head walls 4 and 6, the walls may be formed with spring seats 48, 48, each of said seats having a spring-positioning lug 50 centrally formed thereon. A pair of springs 52, 52 may be seated against the seats 48, 48 on the outboard wall 6 and positioned thereon by the lugs 50, 50, the springs having their opposite ends seated as at 54, 54 against spring seats 56, 56 formed on the upper and lower offset end portions 57, 57, respectively, of the spring plate generally designated 58. Each seat 56 may have formed thereon a lug 60 affording positioning means for the associated spring 52.

The spring plate 58 is of substantially oval formation as viewed in side elevation (Figure 1) and comprises the offset end portions 57, 57 providing the spring seats 56, 56 and lugs 60, 60 on the inboard side, as previously described, and is formed with a central annular opening 62 for reception of a portion 64 of reduced diameter of the trunnion 33, the outboard sides of said end portions 57, 57 being formed with spaced arcuate ribs 66, 66 presenting opposed diagonal wedge surfaces 68, 68 in complementary wedge engagement as at 70, 70 with the top and bottom edges of the wedge member or plate generally designated 72.

The wedge member or plate 72 is provided on the outboard side thereof with spaced parallel webs 74, 74 having openings 76, 76 aligned with an opening 78 extending transversely through the portion 64 of the trunnion 33, said openings receiving a bolt 80 having its threaded end receiving a nut 77 and lock washer 79 for preventing accidental disassembly of said bolt from said ribs 74, 74 of the plate 72 and the portion 64 of the trunnion 33. It will be apparent that the plate 72 is thus fixed to the beam and that the springs interconnect the brake head 2 and spring plate 58 through the medium of the lugs 50, 50 and 60, 60 for common pivotal movement on the beam relative to the plate 72 and the beam. To limit this movement of the brake head and spring plate relative to the beam for a purpose hereinafter described, the plate 72 is formed on the inboard side thereof and at opposite sides of the trunnion 33 with spaced aligned bosses or lugs 82, 82 extending between the offset portions 57, 57 of the spring plate, each of said bosses having flat parallel faces 84, 84 which may engage the angularly arranged faces 86, 86 afforded by the inner margins of the adjacent offset end portion 57 of the spring plate 58.

This limiting arrangement is advantageously employed in the event the springs 52, 52 should become broken in service, which sometimes occurs under the severe conditions to which a device of this type is subject, in which event, the brake head will be prevented from rotating to a point at which it might be knocked off the beam and thereby create the danger of derailment.

In the brake assembly described, the springs 52, 52, compressed between the outboard wall 14 of the brake head and the spring plate 58, will operatively urge the bearing portion 8 of the brake head wall 4 into frictional engagement as at 88 with the wear plate 32 on the brake beam, as well as urging the spring plate 58 into wedge engagement with the wedge member 72 fixed to the brake beam by the nut and bolt assembly. As the spring plate rotates with the brake head during pivotal movement of the latter on the trunnion 33 of the brake beam and relative to the wedge member 72 and the beam, the engaged wedge surfaces of the spring plate and the wedge member will also frictionally resist the pivotal movement of the brake head on the beam. It will be apparent that the engaged wedge surfaces of the spring plate 58 and the wedge member 72 are located a substantial distance from the common axis of rotation of the brake head and spring plate on the brake beam so that the location of the center of frictional contact area will also be situated at the outermost limits allowed for the brake head assembly within an associated car truck whereby an effective control of the brake head will be provided inasmuch as the friction force is applied at a point where it will afford the greatest leverage.

In the assembly of the novel brake arrangement described, the brake head and hanger are assembled with the trunnion 33 of the brake beam, and thereafter the spring plate is sleeved over the reduced portion 64 of the trunnion and the springs seated against the spring seats 48, 48 of the brake head wall 6 and the seats 54, 54 of the spring plate 58 and positioned by the associated lugs. The wedge member or plate 72 is then positioned on the beam with the bosses 82, 82 received between the end portions 57, 57 of the spring plate 58 and the wedge surfaces 68, 68 of the spring plate in engagement as at 70, 70 with the wedge surfaces on the plate 72, the springs 52, 52 there- after being compressed sufficiently to permit the bolt 80 to be inserted in the aligned openings in the reduced portion 64 of the brake beam and the webs 74, 74 of the wedge member 72, whereupon the lock washer 78 and nut 76 may be positioned on the threaded end of the bolt.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In a retainer and balancing mechanism for a pivotal member of an assembly having a substantially cylindrical trunnion member extending through a complementary opening in said pivotal member, said trunnion member including a portion adapted to frictionally engage one side of the pivotal member; the combination of a spring plate loosely sleeved over said trunnion member adjacent the other side of the pivotal member, said plate having spring seats adjacent opposite ends thereof and being rotatable with respect to said trunnion member and movable axially thereof, springs compressed between said seats and said other side of said pivotal member, positioning means for said springs on said other side of said pivotal member and said plate, spaced arcuate wedge surfaces on said plate converging toward one end of said trunnion member, a wedge member on said trunnion member in complementary engagement with said surfaces for centering said plate with respect to said trunnion member and frictionally resisting relative rotatable movement between said plate and the wedge member, spaced flanges on said wedge member extending laterally thereof on opposite sides of said trunnion member, and a bolt and nut assembly extending through aligned openings in said flanges and trunnion member for preventing relative movement between the wedge member and the trunnion member axially of the latter and for accommodating pivotal movement of the wedge member on said bolt and nut assembly to equalize pressure of said springs against said other side of said pivotal member.

2. In a retainer and balancing mechanism for a pivotal member pivotally mounted on a pivot portion of a pivot member having a shoulder in frictional engagement with the pivotal member; the combination of a spring plate loosely sleeved on said portion at the side of said pivotal member remote from said shoulder, coil springs compressed between the inner side of the plate and the pivotal member, said pivotal member and plate having means for positioning said springs, a wedge plate loosely sleeved on said portion, and means for connecting said wedge plate to said portion on a pivotal axis extending transversely thereof intermediate said springs for accommodating pivotal movement of said wedge plate on said axis and for preventing relative pivotal movement between the wedge plate and said portion on the pivotal axis of said pivotal member, the inner side of said wedge plate and the outer side of said spring plate having interengaged arcuate converging faces struck from the last-mentioned axis.

3. In a balancing and retaining device for a pivoted member having an opening receiving a pivot member and having a surface engageable with a shoulder of the pivot member; the combination of a washer having an opening receiving the pivot member, a spring plate disposed between the washer and the pivoted member and having an opening receiving said pivot member, a pair of springs compressed between the plate and the pivoted member for urging said surface against said shoulder and for urging the plate into frictional engagement with the washer, and means pivotally connecting the washer to the pivot member for pivotal movement relative thereto on an axis approximately perpendicular to the longitudinal axis of the pivot member, the first-mentioned axis being approximately perpendicular to a plane bisecting the springs along their axes to equalize the pressure thereof against the pivoted member.

4. In a balancing and retaining device for a pivoted member having an opening receiving a pivot member and having a surface engageable with a shoulder of the pivot member; the combination of a washer loosely sleeved on the pivot member, a spring plate loosely sleeved on the pivot member between the washer and the pivoted member, a bolt pivotally connecting the washer to the pivot member for pivotal movement with respect thereto, and independent springs compressed between the plate and the pivoted member at opposite sides of said bolt for urging the surface against the shoulder and for urging the plate against the washer under pressure equalized by said bolt, said bolt interlocking the washer and pivot member against relative pivotal movement on the pivotal axis of said pivoted member, said spring plate having means engageable with the washer for centering the plate on the pivot member in normal spaced relationship with respect thereto.

5. In a balancing and retaining device for a pivoted member having an opening receiving a pivot member and having frictional engagement with the pivot member along surfaces angularly related to the pivotal axis of said pivoted member; the combination of a spring plate, means for urging said surfaces into engagement comprising a pair of springs compressed between the plate and the pivoted member, a washer sleeved on the pivot member and connected thereto against relative movement on said axis, said washer and plate having complementary conical surfaces frictionally interengaged by said springs to maintain the plate in normal spaced relationship with respect to the pivot member.

6. In a balancing and retaining device for a pivoted member having an opening receiving a pivot member and having frictional engagement with the pivot member along surfaces angularly related to the pivotal axis of said pivoted member; the combination of a spring plate loosely sleeved on the pivot member in normal spaced relationship with respect thereto, means for urging said surfaces into frictional engagement comprising a pair of springs each compressed between one end of the plate and an adjacent surface of the pivoted member, a washer on said pivot member, said washer and plate each having spaced areas formed as complementary segmental conical surfaces struck from said axis, the plate areas being engaged by said springs with respective washer areas to maintain the plate in spaced relationship with respect to the pivot member, and a bolt extending transversely of said pivotal axis connecting the washer to the pivot member, the axis of the bolt extending through a plane along the pivotal axis of said pivoted member intersecting both springs.

7. In a retainer and balancing device for a pivoted member of an assembly including a pivot member extending through an opening of the pivoted member to accommodate rotative movement thereof on the axis of the pivot member; the combination of a friction surface on said pivot member, a smaller diameter extension on said pivot member outboardly of said pivoted member, a washer sleeved on the extension and connected thereto against relative rotative and axial movement on said axis, a spring plate sleeved over said extension and spaced therefrom, said plate and washer having complementary conical surfaces on their adjacent sides, and spring means reacting between the plate and pivoted member for urging the latter against said surface and for urging the plate surfaces into frictional engagement with the washer surfaces.

CARL E. TACK.
WESLEY A. HELSTEN.

REFERENCES CITED

The following references are of record in the file of this patent:

UNITED STATES PATENTS

| Number | Name | Date |
|---|---|---|
| 1,325,516 | Hedgcock | Dec. 23, 1919 |
| 1,643,837 | Christianson et al. | Sept. 27, 1927 |
| 2,010,531 | Baselt | Aug. 6, 1935 |
| 2,281,535 | Drews | Apr. 28, 1942 |

FOREIGN PATENTS

| Number | Country | Date |
|---|---|---|
| 273,064 | Great Britain | June 30, 1927 |